R. R. DUNLOP.
TROLLEY RETRIEVER.
APPLICATION FILED FEB. 20, 1909.
1,039,502.
Patented Sept. 24, 1912.
2 SHEETS—SHEET 1.
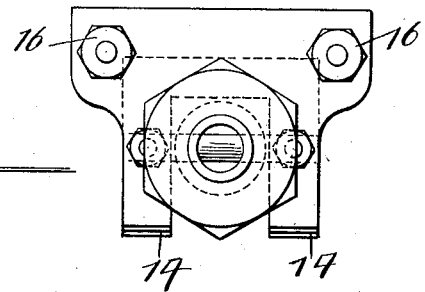
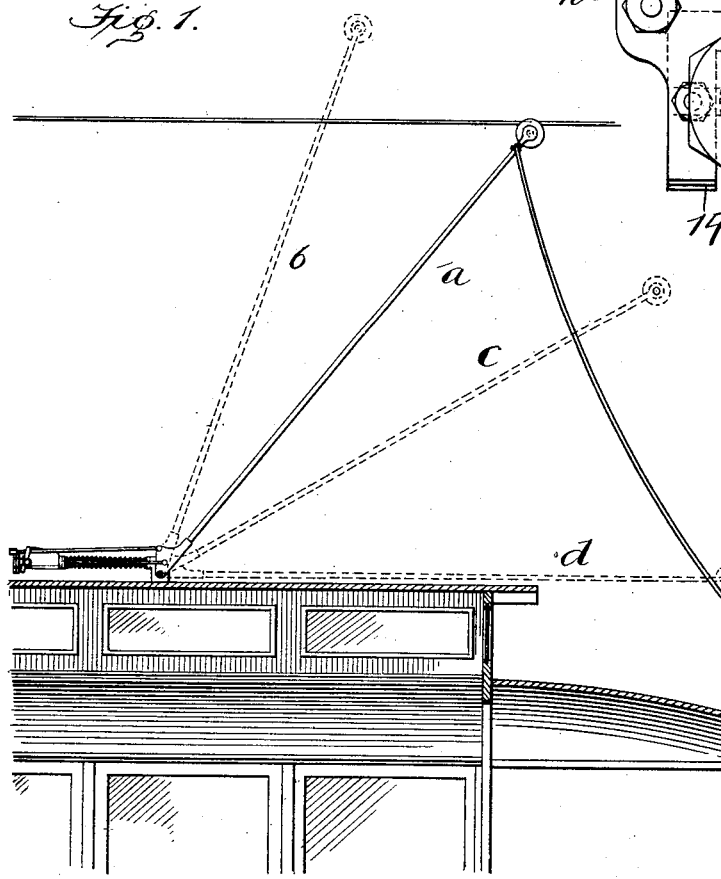
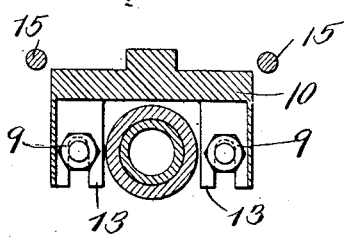
Witnesses
Edwin L Bradford
S. Jay Teller
Inventor
Robert R. Dunlop
By H. H. Bliss
Attorney

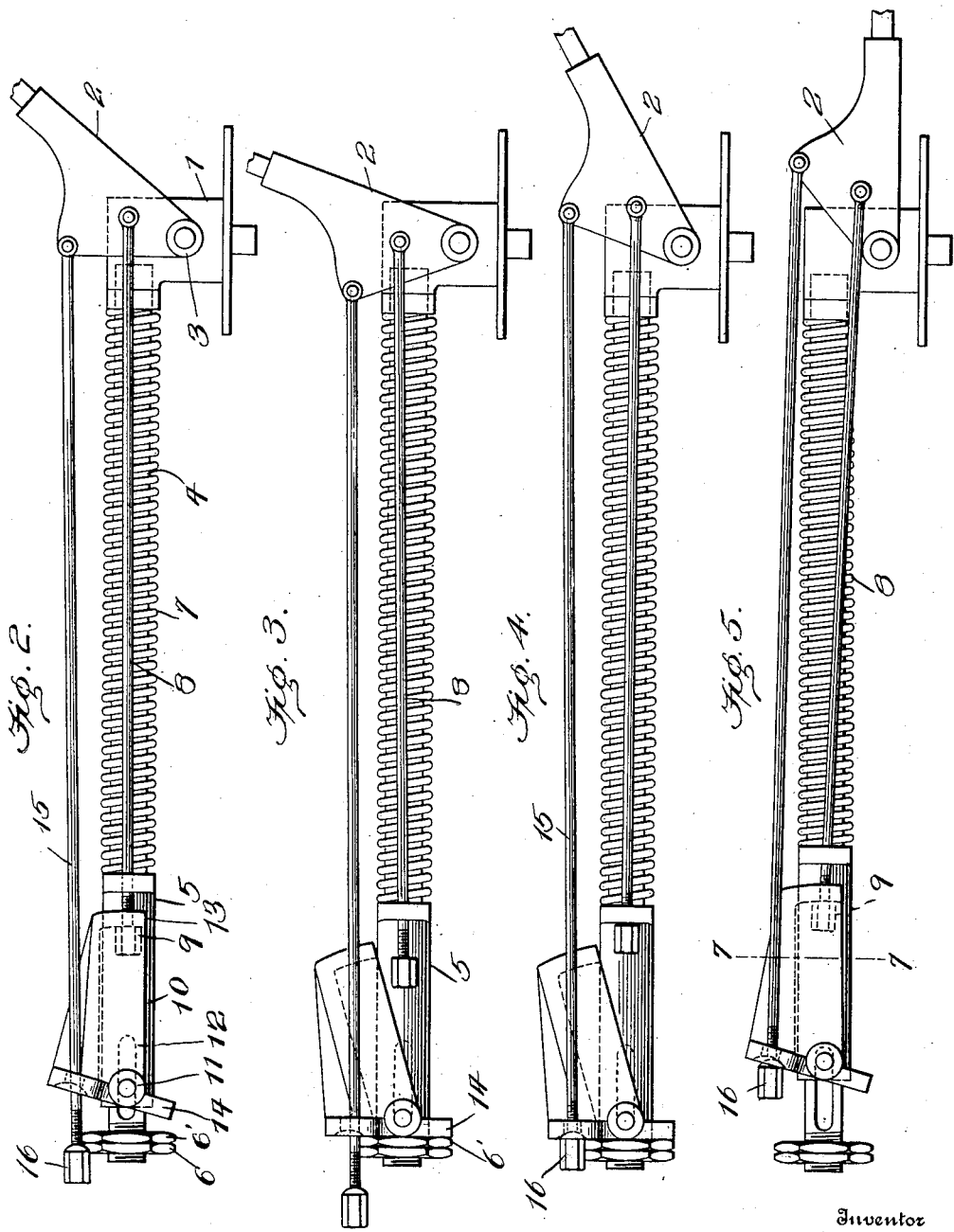

UNITED STATES PATENT OFFICE.

ROBERT ROWSE DUNLOP, OF COLUMBUS, OHIO, ASSIGNOR TO THE JEFFREY MANUFACTURING COMPANY.

TROLLEY-RETRIEVER.

1,039,502.  Specification of Letters Patent.  Patented Sept. 24, 1912.

Application filed February 20, 1909. Serial No. 479,090.

*To all whom it may concern:*

Be it known that I, ROBERT R. DUNLOP, a citizen of the United States, residing at Columbus, in the county of Franklin and State of Ohio, have invented certain new and useful Improvements in Trolley-Retrievers, of which the following is a specification, reference being had therein to the accompanying drawing.
This invention relates to improvements in trolley supporting mechanisms and especially those of the class in which the trolley arm is automatically dropped when the trolley wheel flies off the wire.
The object of the invention is to provide a trolley supporting mechanism of this class, simple in construction and reliable in action and in which the trolley arm may be readily replaced in operative position.
In the drawings—Figure 1 is a side elevation of a portion of a trolley car having a trolley supporting mechanism embodying my invention. Fig. 2 is a side elevation of the mechanism with the arm in operative position. Fig. 3 is a side view with the arm in the position which it takes when the trolley wheel first flies off the wire. Fig. 4 is a side elevation with the arm in the retracted position. Fig. 5 is a side elevation with the arm in the lower or re-setting position. Fig. 6 is an end elevation. Fig. 7 is a cross sectional elevation along the line 7—7 of Fig. 5.

Referring to the drawings, 1 represents the pivotally mounted base upon which the trolley arm 2 is mounted by means of the horizontal pivot 3.

4 is an arm or strut preferably tubular in form which extends from the base 1 in the plane of movement of the trolley arm 2.

5 is a carriage slidably mounted upon the strut 4. The lock nuts 6 and 6′ are screwed upon the end of the strut and may be adjusted to limit the outward movement of the carriage. The coil spring 7 surrounds the strut 4 and engages at its ends with the base 1 and the carriage 5. This is a compression spring and its action, therefore, tends to force the carriage outward.
The connecting rods 8, preferably two in number, are pivotally connected at their forward ends to the trolley arm. The other ends pass loosely through holes in laterally extending flanges on the carriage 5 and are provided with adjustable nuts 9. The hook piece 10 is mounted upon the carriage 5 by means of the pivot 11. This pivot preferably extends through the slot 12 in the strut and thus serves to prevent the carriage turning on the strut. The hook piece is provided with forks 13 which are adapted to fit over the connecting rods 8 and engage the nuts 9. The carriage, the hook piece, and the connecting rods thus form a connection between the spring and the trolley arm, whereby the action of the spring will maintain the trolley arm in operative position. The hook piece is provided with longitudinally projecting lugs 14 which are adapted to engage the nut 6′ when the carriage moves forward and force the hook piece out of engagement with the connecting rods 8.

The connecting rods 15, preferably two in number, are pivotally connected at one end to the trolley arm at points farther removed from the pivotal axis of the trolley arm than the points of connection of the connecting rods 8. The other ends of the connecting rods 15 pass loosely through apertures provided in the upper part of the hook piece and carry the adjustable nuts 16.

The operation of the device is as follows: Fig. 2 shows the trolley arm in operative position, as indicated by *a* of Fig. 1. In this position the force of the spring is transmitted through the carriage 5, the hook piece 10 and the rods 8 to the trolley arm. The connecting rods 15 are inoperative. Fig. 3 shows the mechanism in the position which the spring will cause it to first take when the trolley flies off of the trolley wire. This position is indicated by *b* in Fig. 1. The carriage 5 has been forced outward against the nut 6′, and the lug 14 by engaging the nut 6′ has caused the forked end of the hook piece to be lifted so that it has disengaged the connecting rods 8. No tension is now transmitted through the rod 8 and as the trolley arm is unsupported it falls into the position shown in Fig. 4 and indicated by *c* in Fig. 1. This downward movement is limited by the rods 15, the nuts 16 engaging the hook piece. To re-set the mechanism and place the trolley arm in operative position, it is only necessary to draw the arm down into the position shown in Fig. 5 and indicated by *d* in Fig. 1. The engagement of the nuts 16 with the hook piece draws the whole carriage toward the trolley arm, thus compressing the spring. The hook piece is at the same time drawn downward so that it engages the rods 8. It will be understood that the rods 8 also move during this downward movement of the trolley arm, but as they are pivoted at a point nearer the axis of the trolley arm their movement is less and they are consequently overtaken and engaged by the hook piece. If the trolley arm is now released the spring will engage the connecting rods 8 through the carriage and hook piece and the whole mechanism will assume the position shown in Fig. 2.

Nuts have been provided at the ends of the connecting rods and at the end of the strut so that the whole mechanism may be properly adjusted to allow for wear or for changing conditions such as the height of the trolley wire and the required upward pressure of the trolley arm.

What I claim is:

1. In a trolley supporting mechanism, the combination of a pivotally mounted trolley arm, a slidably mounted carriage, a spring engaging with the carriage and tending to move it in one direction, a connecting member pivotally secured at one end to the trolley arm and slidably engaging the carriage at the other and an engaging device between the carriage and the connecting member whereby the spring may act to hold the trolley arm in operative position, and means whereby the movement of the carriage beyond a certain point will cause the engaging means to disengage the connecting member, substantially as set forth.

2. In a trolley supporting mechanism, the combination with a base and a trolley arm pivotally mounted thereon, of a strut mounted on the base and extending in the plane of motion of the arm, a carriage slidably mounted on the strut near its outer end, a spring adapted to engage the carriage and move it in one direction, connecting devices between the carriage and the arm comprising two separate members in engagement with each other, one member being connected to the arm and the other to the carriage, and means for automatically moving the second said member to disengage the first when the carriage moves beyond a certain point, substantially as set forth.

3. In a trolley supporting mechanism, the combination of a pivotally mounted trolley arm, two connecting devices pivotally fastened to the trolley arm at points unequally distant from the pivotal axis of the arm, a spring, a movable carriage adapted to be acted on by the spring and to engage the connecting device which is fastened to the trolley arm nearest its pivotal axis, the carriage being also adapted to be engaged by the other connecting device whereby said connecting device may move the carriage in opposition to the action of the spring and at a rate greater than the rate of movement of the first connecting device, substantially as set forth.

4. In a trolley supporting mechanism, the combination with a base, and a trolley arm pivotally mounted thereon, of a coiled spring extending longitudinally in the plane of motion of the arm, and engaging at one end with the base, a slidably mounted carriage engaging with the other end of the spring, a hook member pivotally mounted on the carriage, a connecting member pivotally connected at one end to the trolley arm, and engaging at the other end with the hook member, and means whereby the movement of the carriage beyond a certain point will cause the hook to disengage the connecting member, substantially as set forth.

5. In a trolley supporting mechanism, the combination with a base, and a trolley arm pivotally mounted thereon, of a strut mounted on the base and extending in the plane of motion of the arm, a carriage slidably mounted on the strut near its outer end, a spring adapted to engage the carriage and force it outward, a member extending substantially parallel to the strut between the arm at one end and the carriage at the other, means for connecting the member with the arm, means for connecting the member with the carriage, and means for breaking the connection between the member and the carriage when the carriage moves beyond a certain point, substantially as set forth.

6. In a trolley supporting mechanism, the combination with a base and a trolley arm pivotally mounted thereon, of a carriage slidably mounted on the base, a spring arranged to force the carriage outward, a tension member, means for connecting one end of the tension member to the trolley arm, and means on the carriage for engaging the tension member at its other end, the said means being so constructed and arranged that outward movement of the carriage beyond a certain point will cause the tension member to be disengaged, substantially as set forth.

7. In a trolley supporting mechanism, the combination with a base, and a trolley arm pivotally mounted thereon, of a carriage slidably mounted on the base, a spring adapted to force the carriage outward, a hook member pivotally mounted on the carriage, a connecting member pivotally connected at one end to the trolley arm and engaging with the hook member at the other end, and means mounted on the base adapted to engage the hook member to cause it to disengage the connecting member, when the carriage moves outward beyond a certain point, substantially as set forth.

8. In a trolley supporting mechanism, the combination with a base, and a trolley arm pivotally mounted thereon, of a carriage slidably mounted on the base, a spring adapted to force the carriage outward, a hook member pivotally mounted on the carriage, a connecting member pivotally connected at one end to the trolley arm and engaging with the hook member at the other end, means mounted on the base adapted to engage the hook member to cause it to disengage the connecting member, when the carriage moves outward beyond a certain point, and a secondary connecting member pivotally connected at one end to the carriage, and adapted to engage the hook member and move it into engagement with the first connecting member when the trolley arm is moved into a lower position, substantially as set forth.

9. In a trolley supporting mechanism, the combination with a base, and a trolley arm pivotally mounted thereon, of a carriage slidably mounted on the base, a spring adapted to force the carriage outward, a hook member pivotally mounted on the carriage, a connecting member pivotally connected at one end to the trolley arm, and engaging with the hook member at the other end, means mounted on the base adapted to engage the hook member to cause it to disengage the connecting member, when the carriage moves outward beyond a certain point, and a secondary connecting member pivotally connected at one end to the carriage and adapted to engage the hook member and limit the movement of the arm when the first connecting member is disengaged from the hook member, substantially as set forth.

10. In a trolley supporting mechanism, the combination with a base, and a trolley arm pivotally mounted thereon, of a carriage slidably mounted on the base, a spring adapted to force the carriage outward, a hook member pivotally mounted on the carriage, a connecting member pivotally connected at one end to the trolley arm, and engaging with the hook member at the other end, means mounted on the base adapted to engage the hook member to cause it to disengage the connecting member, when the carriage moves outward beyond a certain point, and a secondary connecting member pivotally connected at one end to the carriage, adapted to engage the hook member and limit the movement of the arm when the first connecting member is disengaged from the hook member, and adapted to move the hook member into reëngagement with the first connecting member when the arm is moved into a lower position, substantially as set forth.

11. In a trolley supporting mechanism, the combination with a base, and a trolley arm pivotally mounted thereon, of a strut mounted on the base in the plane of motion of the arm, a carriage slidably mounted on the strut, a spring adapted to force the carriage outward, an adjustable nut on the strut adapted to limit the outward movement of the carriage, a hook member pivotally mounted on the carriage, a connecting member between the hook member and the arm, means on the hook member adapted to be engaged by the nut to cause it to disengage the connecting member, a secondary connecting member between the hook member and the trolley arm, adapted to limit the downward movement of the arm when the first connecting member is disengaged from the hook member, and adapted to engage the hook member and move it into reëngagement with the first connecting member when the trolley arm is moved into a lower position, substantially as set forth.

12. In a trolley supporting mechanism, the combination with a base, and a trolley arm pivotally mounted thereon, of a strut mounted on the base and extending horizontally in the plane of motion of the arm, a carriage slidably mounted on the strut, a coiled spring surrounding the strut and engaging the carriage and the base to force the carriage outward, an adjustable device on the strut adapted to limit the outward movement of the carriage, a hook member pivotally mounted on the carriage, a connecting member between the hook member and the arm, the hook member being adapted to engage the adjustable device to be moved to disengage the connecting member when the carriage moves outward beyond a certain point, and a secondary connecting member between the hook member and the arm, adapted to limit the downward motion of the arm when the first connecting member is disengaged from the hook member, and also adapted to move the hook member into reëngagement with the first connecting member when the arm is moved into a lower position, substantially as set forth.

13. In a trolley supporting mechanism, a pivotally mounted trolley arm, a slidable carriage, means for moving the carriage, an adjustable device for limiting the motion of the carriage, a hook pivotally mounted on the carriage, and a connecting device attached to the trolley arm at one end and engaged by the hook at the other end, a portion of the hook being normally so positioned that it will be engaged by the adjustable limiting means and moved to disengage the connecting device, substantially as set forth.

14. In a trolley supporting mechanism, a pivotally mounted trolley arm, a slidable carriage, means for moving the carriage, an adjustable device for limiting the motion of the carriage, a hook pivotally mounted on the carriage, a connecting device attached to the trolley arm at one end and engaged by the hook at the other end, a portion of the hook being normally so positioned that it will be engaged by the adjustable limiting means and moved to disengage the connecting device, and a second connecting device attached at one end to the trolley arm and the other end engaging the hook when the arm is in horizontal position to move the hook into engagement with the first connecting device, substantially as set forth.

15. In a trolley supporting mechanism, a pivotally mounted trolley arm, a slidable carriage, means for moving the carriage, a device for limiting the motion of the carriage, a hook pivotally mounted on the carriage, and a connecting device attached to the trolley arm at one end and engaged by the hook at the other end, a portion of the hook being normally so positioned that it will be engaged by the adjustable limiting means and moved to disengage the connecting device, substantially as set forth.

In testimony whereof I affix my signature, in presence of two witnesses.

ROBERT ROWSE DUNLOP.

Witnesses:
DUDLEY T. FISHER,
W. R. YOUMANS.

---

Copies of this patent may be obtained for five cents each, by addressing the "Commissioner of Patents, Washington, D. C."